Jan. 5, 1926. Re. 16,245

R. D. SPRINGER

IRONING TABLE

Original Filed Nov. 3, 1921

Inventor
Roy Donald Springer
Geisler & Ramsey
by Atty.

Reissued Jan. 5, 1926. Re. 16,245

UNITED STATES PATENT OFFICE.

ROY DONALD SPRINGER, OF PORTLAND, OREGON.

IRONING TABLE.

Original No. 1,432,215, dated October 17, 1922, Serial No. 512,446, filed November 3, 1921. Application for reissue filed October 9, 1924. Serial No. 742,674.

*To all whom it may concern:*

Be it known that I, ROY DONALD SPRINGER, a citizen of the United States, and a resident of Portland, county of Multnomah, and State of Oregon, have invented a certain new and useful Improvement in Ironing Tables, of which the following in a specification.

The object of my invention is to provide a folding ironing table of simple construction which folds in a compact form and is adapted to support the ironing board firmly when extended in a horizontal position. My invention further has for its object to make my improved ironing board of strong construction throughout.

I attain my objects by providing, in combination with a table-top, a foldable supporting frame for the latter comprising a leg, a crutch hingedly connected with the table-top and adapted to be arranged diagonally therewith, and foldable means for supporting the free end of the table-top, said means including a strut between the table-top and the crutch, and a compression member bearing against the strut and the crutch, the compression member being arranged to bear directly on the lower end of said crutch when the table is set up, thus at a point where the bending stresses are reduced to a minimum.

It is further my object so to arrange the foldable support of my table-top that it may be readily set up.

I attain my object by the device comprising the following elements illustrated in the accompanying drawings, in which.

My ironing table comprises a board or table-top *a* which is supported at one end by a leg preferably made of two uprights *b*, *b*, spaced apart and braced by cross members, $c'$, $c^2$ and $c^3$. This leg is hingedly attached to the table-top by cleats *m*, *m*, provided on the underside thereof, through which extends a hinge rod *i*. The other or free end of the board or table-top *a* is supported by a foldable support comprising a crutch *g* hingedly connected at its upper end with the upper end of said leg by said hinge rod *i*. This crutch is preferably composed of two spaced members which converge towards its lower end and are there fastened together by pins *o*; and it is braced by a cross piece $g'$. To the bottom cross piece $c^3$ of the leg is hingedly attached a link *d* by two staples *l*. The other end of this link *d* is connected to a member *e*, pivoted between the spaced members of the crutch *g* on a pivot pin *j*; and the member *e*, constitutes a strut or supporting element. By reason of the part *e*, being pivoted between the members of the crutch *g*, it cooperates with the compression member *f* in supporting the load imposed on the free end of the table-top. The link *d* holds the leg *b*, rigidly in upright position; all of which is apparent from an inspection of said drawings.

To the strut *e*, is hinged a compression member *f* by hinge *k*. The lower end of said compression member *f* is supported on the lower extermity of the crutch *g* and in connection wtih the members *d*, *e*, sustains directly the load imposed on the free end of the table-top *a*, and supports such load on the lower extermeity of the crutch *g*. Thus the compression member *f* in conjunction with the strut *e* forms a substantial foldable support or frame for the free end of the table-top, adapted to impose, thru the medium of said compression-member, the greater part of the load to which the free end of the table is subject directly on the lower end of the crutch *g*, thus enabling the latter safely to carry said load without tending to bend and break under it.

In other constructions where the load imposed upon the free end of the table-top is supported near the middle of the crutch, there is a tendency to bend the latter excessively and to break it down in the use of the table; but in my foldable table such breaking down is entirely prevented, by reason of the described arrangement of the parts composing the support for the free end of the table-top.

Figure 1:
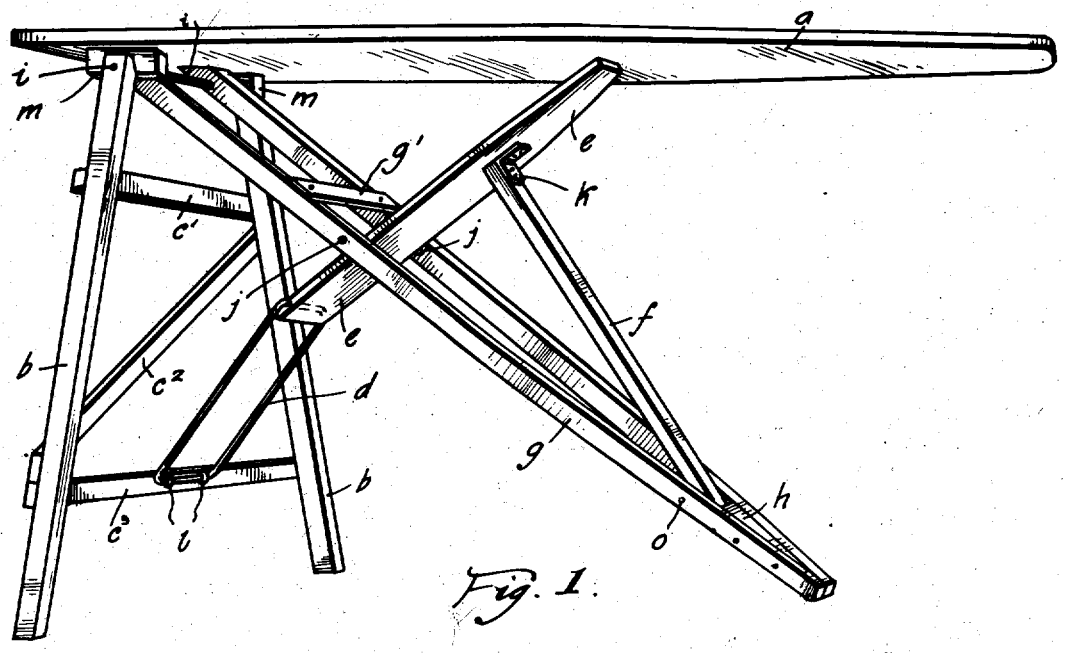
Fig. 1 is a perspective view showing the ironing table in an extended horizontal position so that the table is arranged for ironing.
Figure 2:
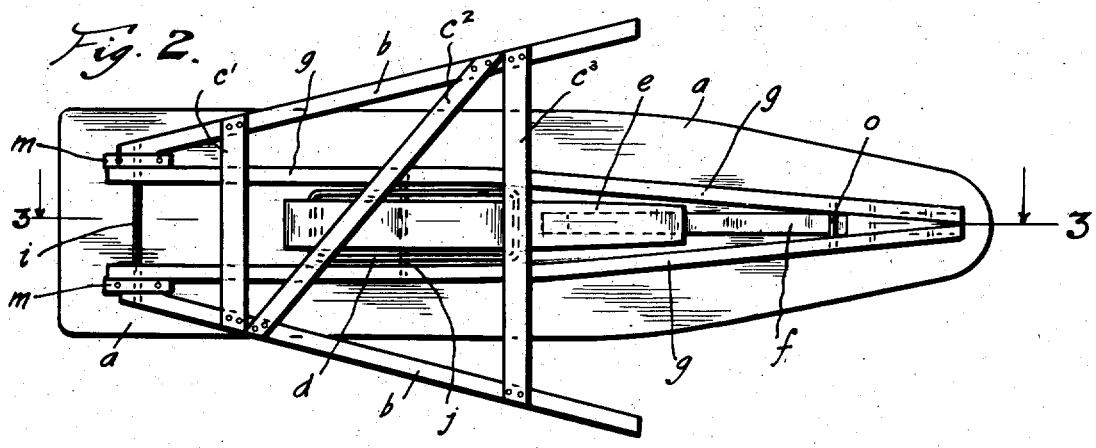
Fig. 2 is a bottom view showing the table collapsed and folded showing how all the parts are spaced so that when they are folded they form a compact body.
Figure 3:
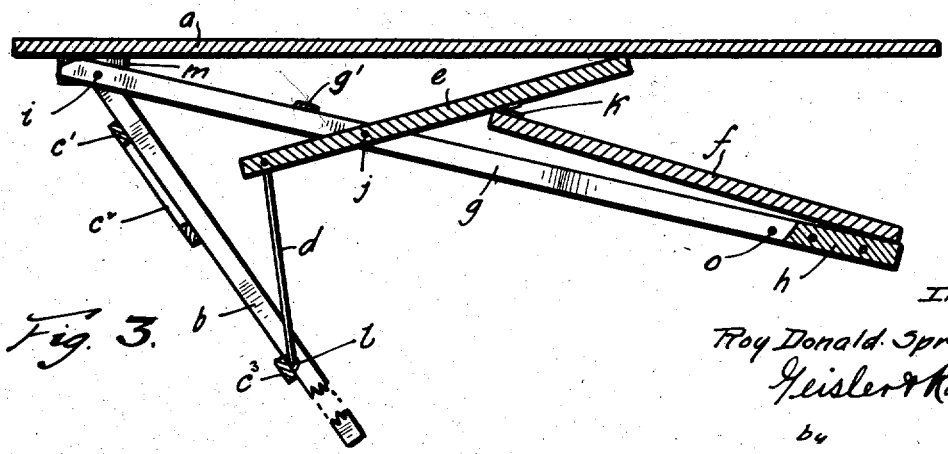
Fig. 3 is a cross sectional view taken on the line 3—3 of Fig. 2; this shows the manner of folding the ironing table and how the parts fold in relation to each other.

When setting up my table the compression member *f* is engaged with the lower extremity *h* of the strut *g*. To fold up my ironing table the compression member *f* is disengaged from said lower extremity *h* of the strut *g*, and then the strut element *e* is disengaged from the free end of the table-top; and the member *e*, being free to pivot on the rod *j*, the parts may then be folded together as illustrated by Fig. 3 and arranged in the final position for storing away as illustrated by Fig. 2. How readily and easily my table may thus be folded together is also illustrated by Fig. 3.

The illustrations and description above given are merely intended to show a practical mode of construction of my device. The particular details of construction above described, are, however, variable to suit the ideas of the manufacturer, provided such variation retains the essential features of my invention.

I claim:

1. An ironing table comprising a leg, an ironing board hinged at one end to the upper end of said leg, a crutch hinged at its upper end to said board, comprising spaced members, a strut hinged between the members of said crutch, a brace bar the upper end of which is hinged to said strut, the lower end of said bar being releasably engageable with the lower end of said crutch and when so engaged supporting the ironing board in horizontal position, and a link connecting the lower end of said strut with the base of said leg.

2. In a table of the character described, a table top a foldable stand comprising a leg supporting one end of the table-top, a crutch hingedly connected at its upper end with the upper end of said leg and adapted to be arranged diagonally therewith, and a support for the free end of the table-top, such support comprising a compression member adapted to be arranged at an angle with said crutch, resting on the lower extremity of the latter, and a supporting element between the free end of the table-top and said crutch, said supporting element intersecting said crutch and being pivotally connected to the latter.

3. In combination with a table-top a foldable supporting frame therefor, comprising a leg, a crutch hingedly connected with the top of said leg and adapted to be arranged diagonally therewith, and foldable means for supporting the free end of the table-top, said means including a strut between the table-top and the crutch, and a compression-member bearing against the strut and the crutch, the compression member being arranged to bear directly on the lower end of the crutch when the table is set up, thereby, enabling the crutch to carry the load imposed upon it without tending to bend and break thereunder.

ROY DONALD SPRINGER.